United States Patent
Liu et al.

(10) Patent No.: US 10,012,857 B2
(45) Date of Patent: Jul. 3, 2018

(54) DISPLAY APPARATUS INCLUDING A PRISM MODULE

(71) Applicant: CHAMP VISION DISPLAY INC., Hsinchu County (TW)

(72) Inventors: Chin-Ku Liu, Hsin-Chu (TW); Huai-Chung Hsu, Hsin-Chu (TW); Yu-Ting Lin, Hsin-Chu (TW); Jhong-Hao Wu, Hsin-Chu (TW)

(73) Assignee: CHAMP VISION DISPLAY INC., Hsinchu County (TW)

( * ) Notice: Subject to any disclaimer, the term of this patent is extended or adjusted under 35 U.S.C. 154(b) by 60 days.

(21) Appl. No.: 15/173,726

(22) Filed: Jun. 6, 2016

(65) Prior Publication Data

US 2017/0131583 A1    May 11, 2017

(30) Foreign Application Priority Data

Nov. 6, 2015 (TW) .............................. 104136597 A

(51) Int. Cl.
*G02F 1/1335* (2006.01)
*G02B 5/04* (2006.01)
(Continued)

(52) U.S. Cl.
CPC ......... *G02F 1/13336* (2013.01); *G02B 5/045* (2013.01); *G02B 27/2214* (2013.01);
(Continued)

(58) Field of Classification Search
CPC .. G02F 1/1333; G02F 1/1335; G02F 1/13336; G02F 1/133308;
(Continued)

(56) References Cited

U.S. PATENT DOCUMENTS 7,134,778 B2    11/2006 Kazuhiro et al.
9,612,468 B1 *    4/2017 Liu ..................... G02F 1/13336
(Continued)

FOREIGN PATENT DOCUMENTS

CN    1661444    8/2005
CN    101206327    6/2008
(Continued)

OTHER PUBLICATIONS

"Search Report of European Counterpart Application," dated Apr. 10, 2017, p. 1-p. 11, in which the listed references were cited.
(Continued)

*Primary Examiner* — Suezu Ellis
(74) *Attorney, Agent, or Firm* — JCIPRNET

(57) ABSTRACT

A display apparatus includes a display device and a prism module. The display device has a display area and a frame area surrounding the display area. The prism module is disposed above the frame area. The prism module includes a plurality of first prism sets and at least one second prism set. The first prism sets are respectively disposed beside a plurality of edges of the display area. The second prism set is disposed beside at least one corner of the display area, and the second prism set is adjacent to the first prism sets. The second prism set includes a plurality of prisms, and the prisms are arranged in a direction away from the corner of the display area. The extending direction of each of the prisms of the second prism set is inclined with respect to the edges of the display area which are adjacent to the corner.

21 Claims, 15 Drawing Sheets

(51) Int. Cl.
*G02F 1/1333* (2006.01)
*G02B 27/22* (2018.01)
*G02F 1/13357* (2006.01)

(52) U.S. Cl.
CPC .......... *G02F 1/1335* (2013.01); *G02F 1/1336* (2013.01); *G02F 1/133504* (2013.01); *G02F 1/133512* (2013.01); *G02F 2001/133626* (2013.01)

(58) Field of Classification Search
CPC .......... G02F 2001/13332; G02F 2001/133607; G02F 2001/13356; G02B 5/0231; G02B 5/045; G02B 6/0016; G02B 6/0036
See application file for complete search history.

(56) References Cited

U.S. PATENT DOCUMENTS

| | | | | |
|---|---|---|---|---|
| 9,851,480 | B2* | 12/2017 | Liu | G02B 5/04 |
| 2003/0231144 | A1* | 12/2003 | Cho | G02B 5/045 |
| | | | | 345/1.3 |
| 2004/0071417 | A1 | 4/2004 | Veligdan | |
| 2009/0059366 | A1 | 3/2009 | Imai | |
| 2014/0218971 | A1* | 8/2014 | Wu | F21V 33/0052 |
| | | | | 362/613 |
| 2015/0092442 | A1* | 4/2015 | Wu | G02B 6/0053 |
| | | | | 362/608 |
| 2015/0116852 | A1* | 4/2015 | Kim | G02B 17/002 |
| | | | | 359/834 |
| 2017/0131584 | A1* | 5/2017 | Liu | G02F 1/13336 |

FOREIGN PATENT DOCUMENTS

| | | |
|---|---|---|
| CN | 201502963 | 6/2010 |
| CN | 102346326 | 2/2012 |
| CN | 102637388 A | 8/2012 |
| CN | 102854644 | 1/2013 |
| CN | 202837794 U | 3/2013 |
| CN | 101593473 | 6/2013 |
| CN | 203644317 U | 6/2014 |
| CN | 103988118 | 8/2014 |
| CN | 105100658 | 11/2015 |
| CN | 102087814 | 4/2016 |
| JP | 2008060061 | 3/2008 |
| JP | 2013195458 | 9/2013 |
| TW | 200541334 | 12/2005 |
| TW | 200846774 | 12/2008 |
| TW | M358323 | 6/2009 |
| TW | 200938913 | 9/2009 |
| TW | 201319685 | 5/2013 |
| TW | 201341864 | 10/2013 |
| TW | 201403177 | 1/2014 |
| TW | 201432351 | 8/2014 |
| TW | 201447836 | 12/2014 |
| TW | 201513074 | 4/2015 |
| TW | I507787 | 11/2015 |
| WO | 2010124542 | 11/2010 |
| WO | 2013134621 | 9/2013 |
| WO | 2015133488 | 9/2015 |

OTHER PUBLICATIONS

"Office Action of Taiwan Counterpart Application", dated Jul. 20, 2016, p. 1-p. 10, in which the listed references were cited.

\* cited by examiner

DISPLAY APPARATUS INCLUDING A PRISM MODULE

CROSS-REFERENCE TO RELATED APPLICATION

This application claims the priority benefit of Taiwan application serial no. 104136597, filed on Nov. 6, 2015. The entirety of the above-mentioned patent application is hereby incorporated by reference herein and made a part of this specification.

BACKGROUND OF THE INVENTION

Field of the Invention

The invention relates to a display apparatus.

Description of Related Art

Large screen display system is widely used in the control room in many fields, such as telecommunication management network, direction guidance by traffic police, traffic monitoring and management, command in military combat training, industrial production control, etc., it can display a variety of signals from different signal sources and can satisfy the user's requirements about displaying a variety of shared information and general information in a large display screen. Otherwise, the application that a plurality of display screens are spliced together to achieve a larger display screen is also applied in many fields. Recently, in order to achieve a large screen display system or a general display screen splicing, the common way is that a plurality of liquid crystal displays (LCDs) are adopted to be display units and to be spliced together.

The liquid crystal display is the mainstream display after years of development. The advantages of the liquid crystal display are thin, light weight, low power consumption, long lifespan, non-radiation, and the display screen of the liquid crystal display is exquisite and high resolution, otherwise, each of key performance indicators of the liquid crystal display is outstanding. However, although the liquid crystal display has the advantages as mentioned above, it is very difficult to avoid the non-effective region and the front frame structure of the liquid crystal display panel based on the principle of operation of the liquid crystal display. Therefore, when the LCDs are adopted to achieve splicing many display screens, there are frames existing between the display screens of the LCDs so as to result in the overall display not being continuous and to affect the ornamental quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a display apparatus which can achieve a borderless display effect.

Other target and good point of the invention is providing a better understanding based on the technical characteristic that is disclosed.

To achieve at least one of the above-mentioned objectives or other objectives, one embodiment of the invention provides a display apparatus. The display apparatus includes a display device and a prism module. The display device has a display area and a frame area surrounding the display area. The prism module is disposed above the frame area. The prism module includes a plurality of first prism set and at least one second prism set. The first prism sets are respectively disposed beside a plurality of edges of the display area. The second prism set is disposed beside at least one corner of the display area, and the second prism set is adjacent to the first prism sets. The second prism set includes a plurality of prisms, and the prisms are arranged in a direction away from the corner of the display area. The extending direction of each of the prisms of the second prism set is inclined with respect to the edges of the display area which are adjacent to the corner.

Based on the above, the embodiments of the invention have at least one of the advantages or effects below. In the display apparatus of the embodiments of the invention, the prism module includes a plurality of first prism sets and at least one second prism set. The first prism sets are respectively disposed beside a plurality of edges of the display area. The second prism set is disposed beside at least one corner of the display area, and the second prism set is adjacent to the first prism sets. The second prism set includes a plurality of prisms, and the prisms are arranged in the direction away from the corner of the display area. The extending direction of each of the prisms of the second prism set is inclined with respect to the edges of the display area which are adjacent to the corner. Therefore, the display apparatus can achieve a borderless display effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
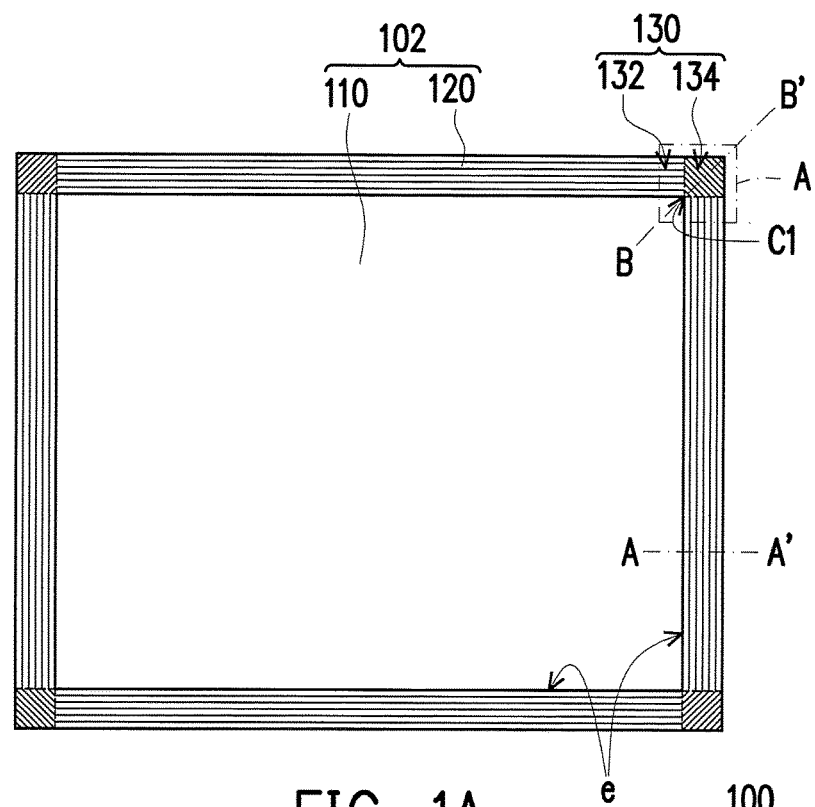
FIG. 1A is a schematic top view depicting a display apparatus of an embodiment of the invention.

FIG. 1A is a schematic top view depicting a display apparatus of an embodiment of the invention, referring to FIG. 1A. In the present embodiment, a display apparatus 100 includes a display device 102. The display device 102 has a display area 110 and a frame area 120 surrounding the display area 110. To be more specific, the display device 102 is, for example, a liquid crystal display (LCD). The display area 110 has a plurality of pixels (not shown) to show a displayed image, and the frame area 120 is a non-display area of the display device 102. In some embodiments, the display device 102 may also be other types of displays, such as organic light emitting display (OLED), etc., but the invention is not limited thereto.

Figure 1B:
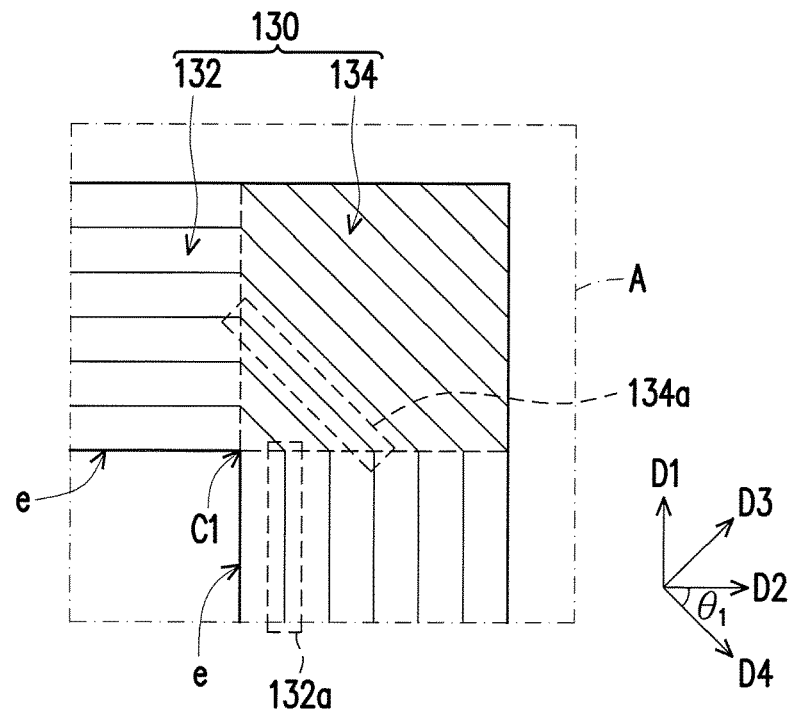
FIG. 1B is an enlarged schematic view depicting an area A of the display apparatus of the embodiment in FIG. 1A.

FIG. 1B is an enlarged schematic view depicting an area A of the display apparatus of the embodiment in FIG. 1A, referring to FIG. 1A and FIG. 1B simultaneously. In the present embodiment, the display apparatus 100 includes a prism module 130 disposed above the frame area 120. The prism module 130 includes a plurality of first prism sets 132 and a plurality of second prism sets 134. To be more specific, the display area 110 has a plurality of edges e located at the junction of the display area 110 and the frame area 120, and the first prism sets 132 are respectively disposed beside the edges e of the display area 110. In addition, the display area 110 of the present embodiment has a plurality of corners C1 located at the intersection point of two adjacent edges e. The second prism sets 134 are disposed beside the corners C1 of the display area 110, and the second prism sets 134 are adjacent to the first prism sets 132. In some embodiments, according to actual demand, the prism module 130 may also include a single second prism set 134 disposed at a corner C1 of the display area 110, the invention is not limited thereto. In addition, in the present embodiment, the first prism sets 132 and the second prism sets 134 cover the frame area 120. However, in some embodiments, the first prism sets 132 and the second prism sets 134 may also cover a part of the display area 110, but the invention is not limited thereto.

Referring to FIG. 1B again, in the present embodiment, each of the first prism sets 132 includes a plurality of prisms 132a. The prisms 132a are arranged in a direction away from the display area 110. The extending direction of each of the prisms 132a of each of the first prism sets 132 is substantially parallel to the edge e of the display area 110 that is adjacent to the first prism set 132. Take the first prism set 132 which is adjacent to and below the second prism set 134 in FIG. 1B as an example, the prisms 132a of the first prism set 132 are, for example, arranged along a direction D2, wherein the direction D2 is a direction away from display area 110. Each of the prisms 132a of this first prism set 132 is, for example, extended along a direction D1, and the direction D1 is substantially parallel to the edge e of the display area 110 that is adjacent to this first prism set 132. Deduced therefrom by analogy, the prisms 132a of the first prism set 132 that are adjacent to the left of the second prism set 134 in FIG. 1B are, for example, arranged along the direction D1, wherein the direction D1 is a direction away from the display area 110. Each of the prisms 132a of this first prism set 132 is, for example, extended along the direction D2, and the direction D2 is substantially parallel to the edge e of the display area 110 that is adjacent to this first prism set 132. In addition, the second prism set 134 includes a plurality of prisms 134a. The prisms 134a are arranged in a direction away from the corner C1 of the display area 110. The extending direction of each of the prisms 134a of the second prism set 134 is inclined with respect to the edges e of the display area 110 adjacent to the corner C1. To be more specific, the prisms 134a of the second prism set 134 are, for example, arranged along a direction D3, wherein the direction D3 is a direction away from the corner C1 of the display area 110. Each of the prisms 134a of the second prism set 134 is extended along a direction D4, and the direction D4 is inclined with respect to the edges e of the display area 110 adjacent to the corner C1.

In the present embodiment, the prisms 134a of the second prism set 134 are, for example, extended along the direction D4, and angles $\theta_1$ are acute angles between the direction D4 and the edges e in the display area 110 that are adjacent to the corner C1. To be more specific, the angle $\theta_1$ is greater than or equal to 15 degrees and smaller than or equal to 75 degrees. For example, the angle $\theta_1$ is preferred to be 45 degrees. In some embodiments, the angle $\theta_1$ may also have other different angle values, the invention is not limited thereto. In addition, in the present embodiment, the second prism set 134 connects the adjacent first prism sets 132. To be more specific, each of two ends of each prism 134a of the second prism set 134 connects with a prism 132a of an adjacent first prism set 132. However, in some embodiments, the second prism set 134 may also not connect with the adjacent first prism sets 132, but the invention is not limited thereto.

Figure 1C:
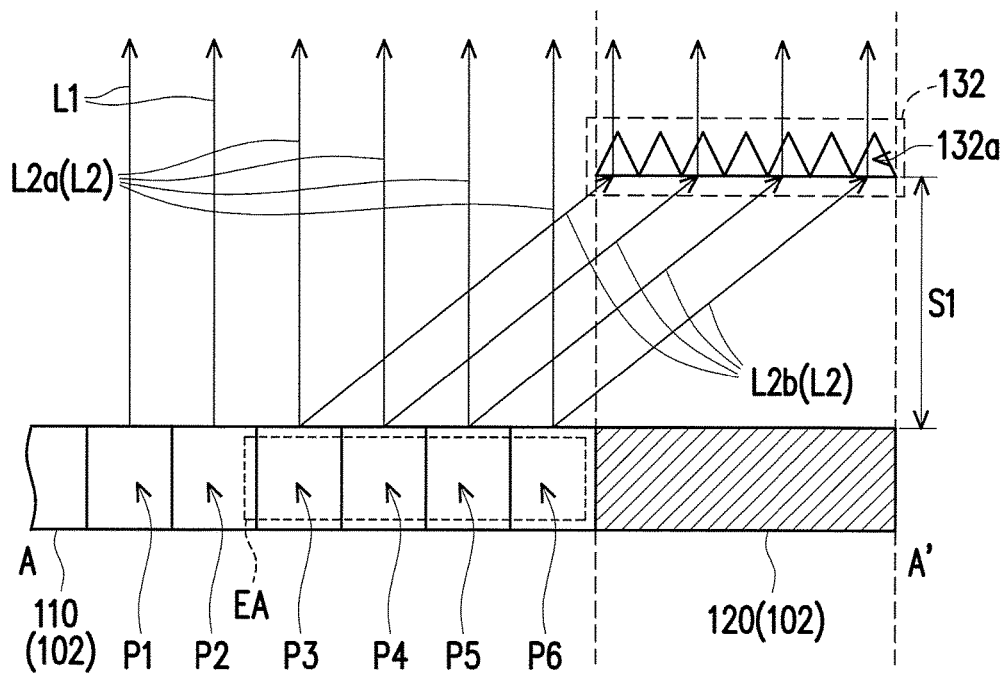
FIG. 1C is a cross-sectional view depicting a junction (along a line A-A') between an edge of a display area and a frame area of the display apparatus of the embodiment in FIG. 1A.

FIG. 1C is a cross-sectional view depicting a junction (along a line A-A') between an edge of a display area and a frame area of the display apparatus of the embodiment in FIG. 1A, referring to FIG. 1A and FIG. 1C simultaneously. In the present embodiment, each of the first prism sets 132 and the frame area 120 have a space S1 therebetween. For example, the first prism set 132 may be fastened by a fastening member of the outer frame or the interior of the display device 102, so as to keep the space S1 between the first prism set 132 and the frame area 120. In a different way, the display apparatus 100 may further include a transparent plate or a support member located between the first prism set 132 and the frame area 120, so as to form the space S1 between the first prism set 132 and the frame area 120, but the invention is not limited thereto. In addition, tips of the prisms 132a of the first prism set 132 face toward a direction away from the frame area 120. In some embodiments, tips of the prisms 132a of the first prism set 132 may face toward the frame area 120, but the invention is not limited thereto.

To be more specific, the display area 110 of the present embodiment has an edge area EA. The edge area EA is an area of the display area 110 that is close to the frame area 120. The display area 110 has a plurality of pixels at the junction of the edge e and the frame area 120, such as pixel P1, pixel P2, pixel P3, pixel P4, pixel P5, and pixel P6, so as to show the displayed image. The pixel P3, the pixel P4, the pixel P5, and the pixel P6 are located inside of the edge area EA, and the pixel P1 and the pixel P2 are located outside of the edge area EA. In the present embodiment, the pixel P3, the pixel P4, the pixel P5, and the pixel P6 emit the light beams L2. The light beams L2 include the light beams L2a and the light beams L2b, wherein the light beams L2a are emitted from a part of the pixels that has a smaller opening angle, and the light beams L2b are emitted form a part of the pixels that has a larger opening angle. The light beams L2a may be transmitted forward and upright to the position above the display area 110, and the light beams L2b may be transmitted obliquely to the position above the frame area 120. To be more specific, the light beams L2b are obliquely transmitted to the first prism set 132 located above the frame area 120, and refracted by the prism 132a of the first prism set 132 so that the transmission direction of the light beams L2b is changed. Subsequently, the light beams L2b refracted by the prisms 132a are transmitted forward and upright to the position above the frame area 120. In the present embodiment, the light beams L1 that are emitted from the pixel P1 and the pixel P2 located outside of the edge area EA may be transmitted forward and upright to the position above the display area 110, and the light beams L2a that are emitted from the pixel P3, the pixel P4, the pixel P5, and the pixel P6 located inside of the edge area EA may also be transmitted forward and upright to the position above the display area 110, so that the display area 110 may show the displayed image. In addition, the light beams L2b emitted by the pixel P3, the pixel P4, the pixel P5, and the pixel P6 are refracted by the first prism set 132 and transmitted forward and upright to the position above the frame area 120, thus, parts of the frame area 120 that is close to the edges e of the display area 110 may also show the displayed image. Therefore, the display area 110 and the frame area 120 of the display apparatus 100 both may be used to display the image.

In the present embodiment, the light beams L2a and the light beams L2b are substantially from the same pixel P3, pixel P4, pixel P5, and pixel P6, therefore, the displayed image of the frame area 120 is the same as a part of the displayed image of the display area 110. However, in some embodiments, an appropriate optical member may also be configured according to actual demand, wherein the light beams emitted from a part of the pixels of the display area 110 form the displayed image of the frame area 120 via the first prism set 132, and those light beams emitted from those pixels do not be transmitted forward and upright to the position above the display area 110, so that the displayed image of the frame area 120 is different from the displayed image of the display area 110, but the invention is not limited thereto.

Figure 1D:
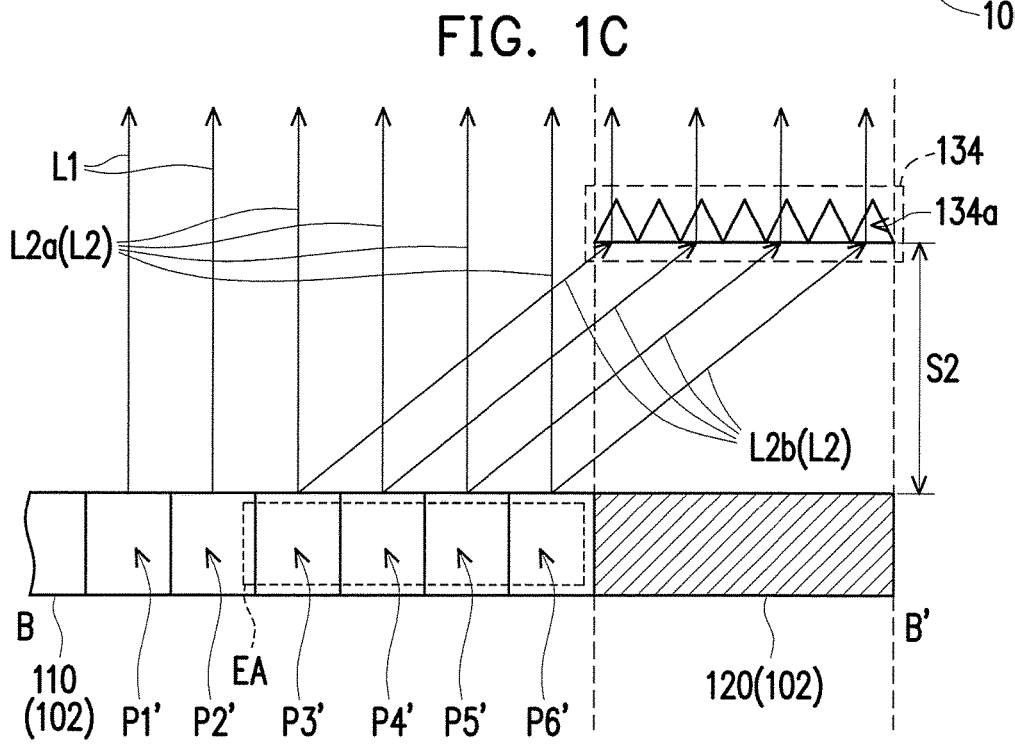
FIG. 1D is a cross-sectional view depicting the junction (along a line B-B') between a corner of the display area and the frame area of the display apparatus of the embodiment in FIG. 1A.

FIG. 1D is a cross-sectional view depicting the junction (along a line B-B') between a corner of the display area and the frame area of the display apparatus of the embodiment in FIG. 1A, referring to FIG. 1A and FIG. 1D simultaneously. In the present embodiment, the second prism set 134 and the frame area 120 have a space S2 therebetween. The fastening method of second prism set 134 may be, for example, similar to the fastening method of the first prism set 132, and the second prism set 134 is fastened above of the frame area 120. The fastening method of second prism set 134 may refer to the fastening method of the first prism set 132, and will not be repeated. In addition, the space S2 may be the same as or different from the space S1, and the invention is not limited thereto. In present embodiment, tips of the prisms 134a of the second prism set 134 face toward a direction away from the frame area 120. In some embodiments, tips of the prisms 134a of the second prism set 134 may face toward the frame area 120, but the invention is not limited thereto.

To be more specific, the display area 110 has a plurality of pixels at the junction of the corner C1 and the frame area 120, such as a pixel P1', a pixel P2', a pixel P3', a pixel P4', a pixel P5', and a pixel P6', so as to show the displayed image. The pixel P3', the pixel P4', the pixel P5', and the pixel P6' are located inside of the edge area EA, and the pixel P1' and the pixel P2' are located outside of the edge area EA. In present embodiment, the function of the prisms 134a of the second prism set 134 is similar to the function of the prisms 132a of the first prism set 132. The light beams L2b emitted from the pixel P3', the pixel P4', the pixel P5', and the pixel P6' is obliquely transmitted to the second prism set 134 located above the frame area 120, and refracted by the prism 134a of the second prism set 134 so that the transmission direction of the light beam L2b is changed. Subsequently, the light beams L2b refracted by the prisms 134a transfer forward and upright to a position above the frame area 120. Therefore, parts of the frame area 120 that is close to the corners C1 of the display area 110 may also show the displayed image, so that the display area 110 and the frame area 120 of the display apparatus 100 both may display the image.

Figure 1E:
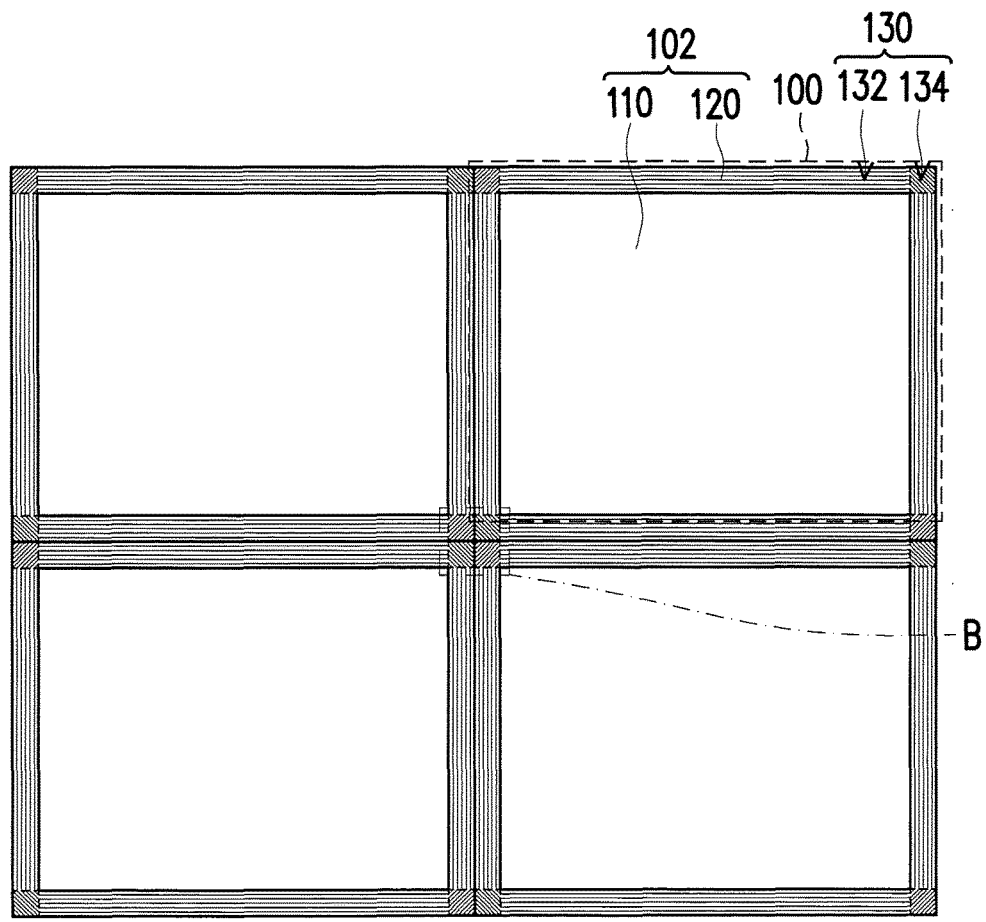
FIG. 1E is a schematic top view depicting a plurality of display apparatuses of the embodiment in FIG. 1A being spliced together according to one embodiment of the invention.
Figure 1F:
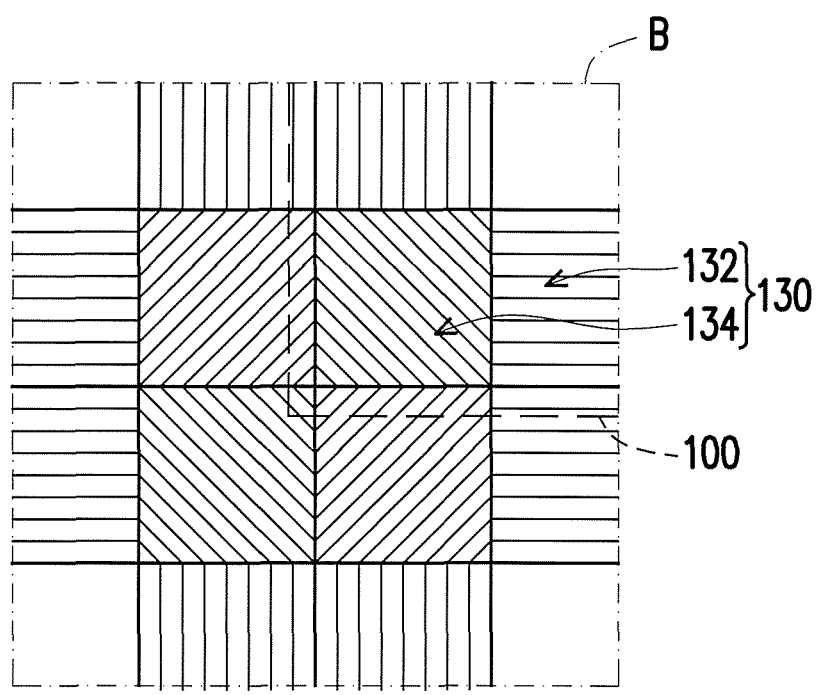
FIG. 1F is an enlarged schematic view depicting an area B of the display apparatuses of the embodiment in FIG. 1E.

FIG. 1E is a schematic top view depicting a plurality of display apparatuses of the embodiment in FIG. 1A being spliced together according to one embodiment of the invention, and FIG. 1F is an enlarged schematic view depicting an area B of the display apparatuses of the embodiment in FIG. 1E, referring to FIG. 1E and FIG. 1F. In the present embodiment, four display apparatuses 100 are spliced to each other by the way of 2×2, so as to achieve an effect that a larger display image is displayed. However, in some embodiments, other types of splicing the display apparatuses may also be adopted, and other ways of splicing the display apparatuses may be adopted, and the invention is not limited thereto. In the present embodiment, the light beams that are emitted by the display area 110 and refracted by the first prism set 132 are transmitted forward and upright to the position above the frame area 120, thus, parts of the frame area 120 that is close to the edges e of the display area 110 may also show the displayed image. In addition, the light beams that are emitted by the display area 110 and refracted by the second prism set 134 are transmitted forward and upright to the position above the frame area 120, thus, parts of the frame area 120 that is adjacent to the corners C1 of the display area 110 may also show the displayed image. Therefore, the display area 110 and the frame area 120, which originally is the non-display area, of the display apparatus 100 both may display the image, so that the display apparatus 100 can achieve a borderless display effect. In the present embodiment, when the viewer watches the display apparatuses 100 as shown in FIG. 1E, the viewer cannot notice the frames of the display apparatuses 100.

Figure 2:
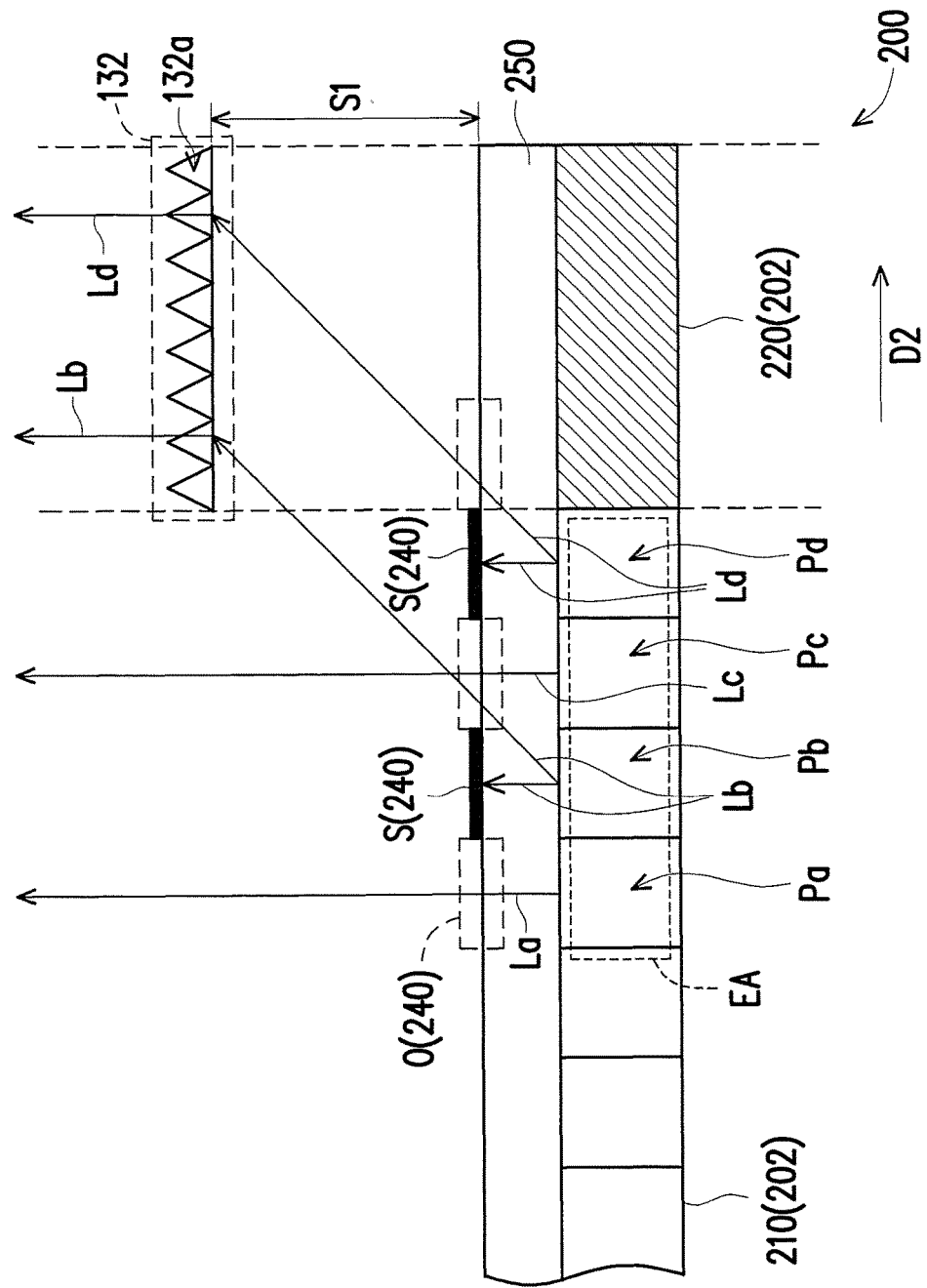
FIG. 2 is a cross-sectional view depicting a junction between an edge of a display area and a frame area of a display apparatus of another embodiment of the invention.

FIG. 2 is a cross-sectional view depicting a junction between an edge of a display area and a frame area of a display apparatus of another embodiment of the invention, referring to FIG. 2. In the present embodiment, the display apparatus 200 is similar to the display apparatus 100 that is depicted in FIG. 1A to FIG. 1E. The members and the related description of the display apparatus 200 may refer to the display apparatus 100 in FIG. 1A to FIG. 1E, and will not be repeated. The difference between the display apparatus 200 and the display apparatus 100 is that the display apparatus 200 includes a display device 202. The display device 202 has a display area 210 and a frame area 220 surrounding the display area 210. The display apparatus 200 further includes a parallax barrier 240 disposed at an edge area EA of the display area 110. In the present embodiment, the display area 210 includes a plurality of pixels, and a part of the pixels include a pixel Pa, a pixel Pb, a pixel Pc, and a pixel Pd which are sequentially arranged along the direction D2. At least the pixel Pa, the pixel Pb, the pixel Pc, and the pixel Pd are located in the edge area EA. In addition, the direction D2 is a direction from the display area 210 to the frame area 220. To be more specific, the parallax barrier 240 covers the edge area EA and has a plurality of light-shielding parts S that shield a part of a plurality of pixels in the edge area EA, such as the pixel Pb and the pixel Pd. In addition, the parallax barrier 240 has a plurality of light-transmitting parts O that expose another part of the pixels in the edge area EA, such as the openings expose the pixel Pa and the pixel Pc. In the present embodiment, a transparent plate 250 having an appropriate thickness may be optionally disposed between the display device 202 and the parallax barrier 240, so as to adjust the distance between the parallax barrier 240 and the display device 202.

In the present embodiment, the light beams emitted by the part of the pixels that are shielded by the light-shielding parts S are obliquely transmitted to the prism module 130 via the light-transmitting parts O and refracted to the position above the prism module 130 by the prism module 130. To be more specific, the pixel Pb and the pixel Pd that are shielded by the light-shielding parts S of the parallax barrier 240 emit the light beams Lb and the light beams Ld, respectively. A part of the light beams Lb and a part of the light beams Ld are shielded by the light-shielding parts S of the parallax barrier 240, and another part of the light beams Lb and another part of the light beams Ld are obliquely transmitted through the light-transmitting parts O to the first prism set 132 of the prism module 130 and refracted to the position above the prism module 130 by the prisms 132a of the first prism set 132. In addition, in the present embodiment, the light beams emitted by another part of the pixels that are exposed by the light-transmitting parts O are transmitted towards the position above the display area 110 via the light-transmitting parts O. To be more specific, the pixel Pa and the pixel Pc that are not shielded by the light-shielding parts S of the parallax barrier 240 emit the light beams La and the light beams Lc, respectively. The light beams La and the light beams Lc are transmitted towards the position above the display area 110 through the light-transmitting parts O.

In the present embodiment, the viewer above the display apparatus 200 can see the light beams La from the pixel Pa, the light beams Lc from the pixel Pc, the light beams Lb from the pixel Pb, and the light beams Ld from the pixel Pd sequentially along the direction D2. To be more specific, the light beams La from the pixel Pa and the light beams Lc from the pixel Pc are displayed by the display area 210, and the light beams Lb from the pixel Pb and the light beams Ld from the pixel Pd are displayed by the frame area 220. In other words, based on the design of the pixels located in the edge area EA and based on shielding the pixels of the parallax barrier 240, the display apparatus 200 may display different images on the display area 210 and the frame area 220.

Figure 3:
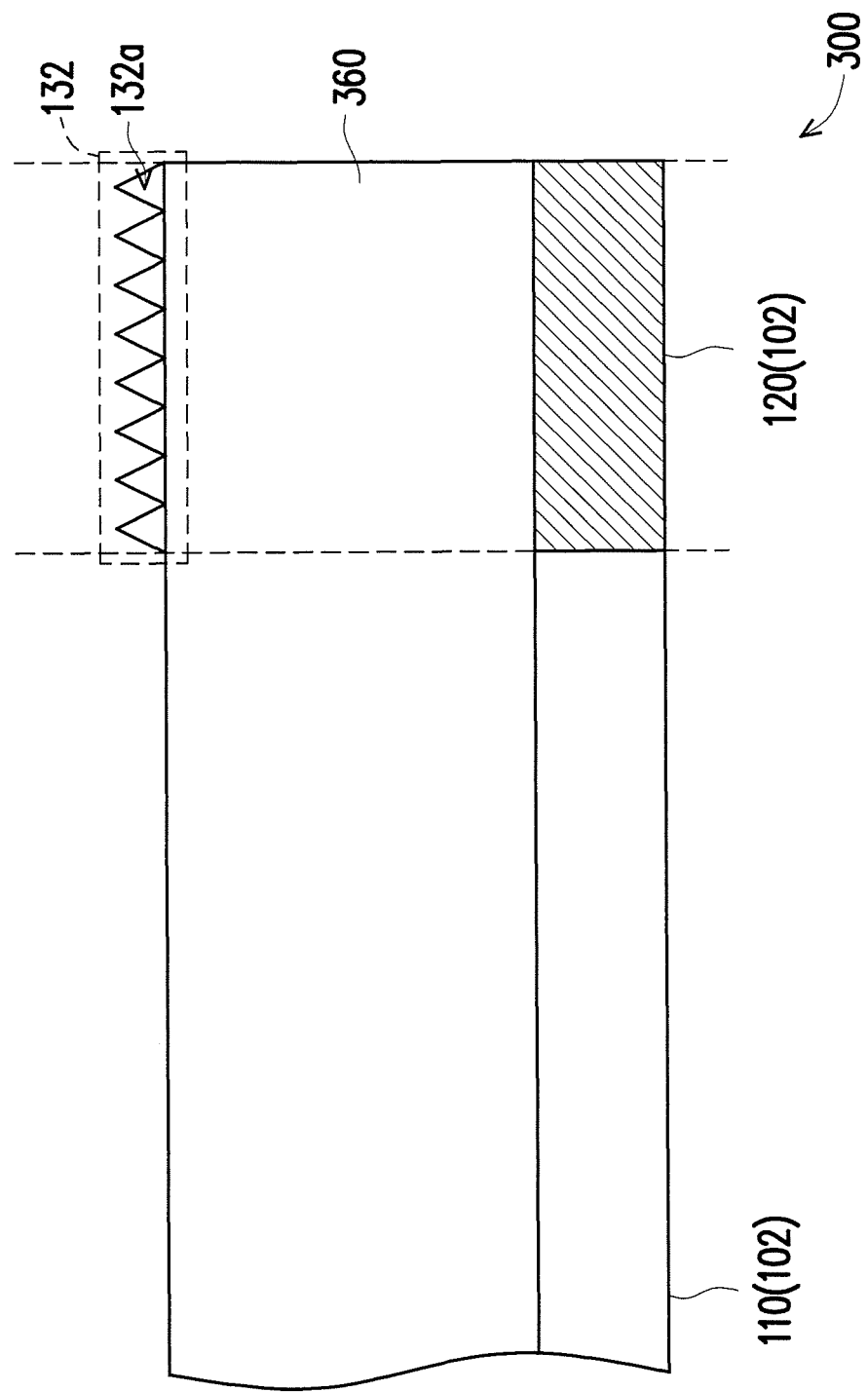
FIG. 3 is a cross-sectional view depicting a junction between an edge of a display area and a frame area of a display apparatus of another embodiment of the invention.

FIG. 3 is a cross-sectional view depicting a junction between an edge of a display area and a frame area of a display apparatus of another embodiment of the invention, referring to FIG. 3. In the present embodiment, the display apparatus 300 is similar to the display apparatus 100 that is depicted in FIG. 1A to FIG. 1F. The members and the related description of the display apparatus 300 may refer to the display apparatus 100 in FIG. 1A to FIG. 1F, and will not be repeated. The difference between the display apparatus 300 and the display apparatus 100 is that the display apparatus 300 includes a light-transmitting element 360 disposed between the first prism set 132 and the display device 102, and the light-transmitting element 360 carries the first prism set 132. The light-transmitting element 360 may be, for example, glass or plastic, the first prism set 132 is adhered on the light-transmitting element 360, and the light-transmitting element 360 is adhered or partly adhered on the display device 102. In addition, in the present embodiment, the light-transmitting element 360 is also disposed between the second prism set (not shown) and the display device 102, and the light-transmitting element 360 carries the second prism set (not shown). To be more specific, the light-transmitting element 360 makes the first prism set 132 and the second prism set (not shown) locate above the frame area 120 of the display device 102, so as to keep an appropriate distance between the first prism set 132 and the frame area 120, and to keep an appropriate distance between the second prism set (not shown) and the frame area 120. In some embodiments, the light-transmitting element 360 may cover the display area 110 and the frame area 120 of the display device 102 partly or completely, and the invention is not limited thereto. In addition, in some embodiments, the display apparatus further includes a light-transmitting cover covering the display area and the frame area. In addition, the prism module is disposed between the light-transmitting cover and the display device. In these embodiments, at least the light-transmitting cover may be used to protect the display device and the prism module, or at least the light-transmitting cover may be used to fasten the prism module, and the invention is not limited thereto. In the present embodiment, the display apparatus 300 may also achieve the borderless display effect which is similar to the borderless display effect of the display apparatus 100 of the embodiment in FIG. 1A to FIG. 1F.

Figure 4:
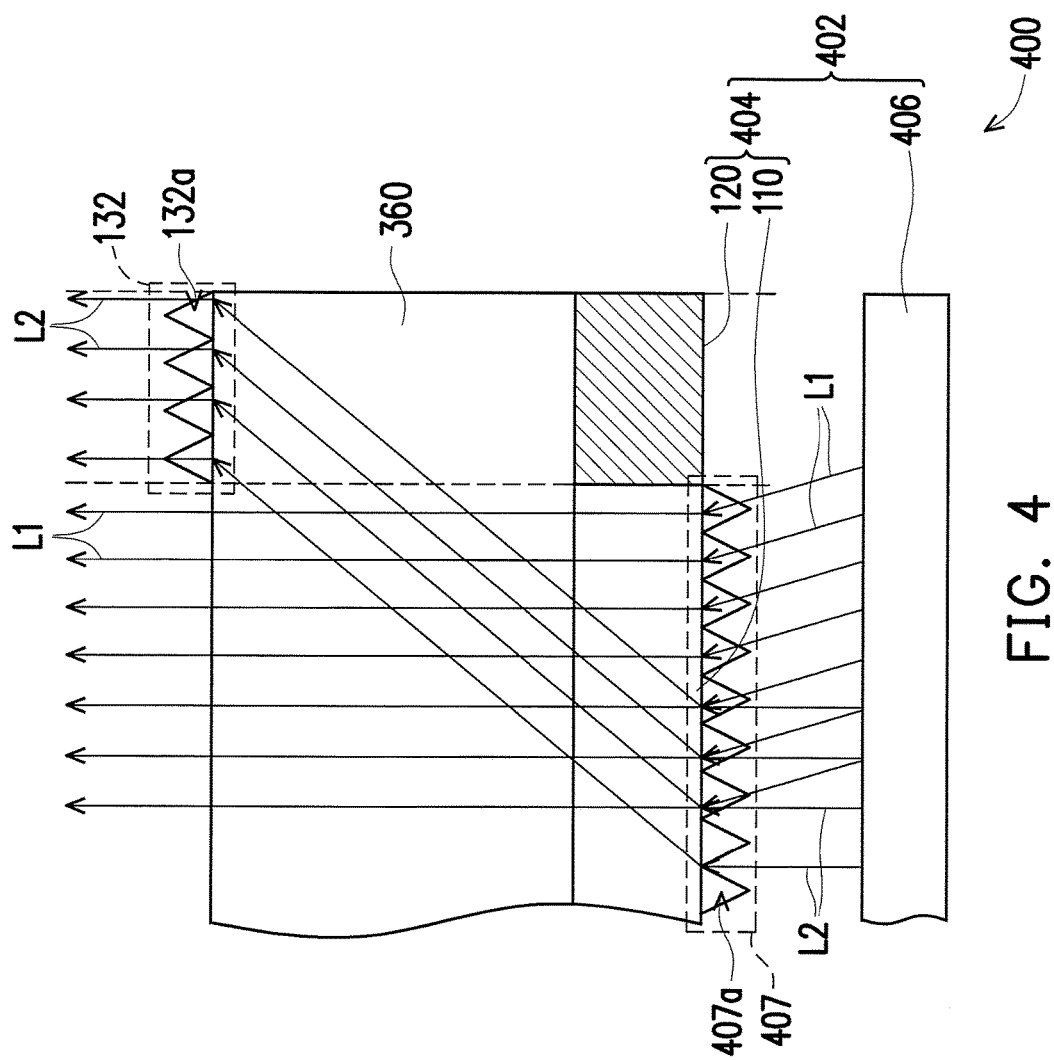
FIG. 4 is a cross-sectional view depicting a junction between an edge of a display area and a frame area of a display apparatus of another embodiment of the invention.

FIG. 4 is a cross-sectional view depicting a junction between an edge of a display area and a frame area of a display apparatus of another embodiment of the invention, referring to FIG. 4. In the present embodiment, the display apparatus 400 is similar to the display apparatus 300 of the embodiment in FIG. 3. The members and the related description of the display apparatus 400 may refer to the display apparatus 300 of the embodiment in FIG. 3, and will not be repeated. The difference between the display apparatus 400 and the display apparatus 300 is that the display device 402 of the display apparatus 400 includes a backlight module 406 and a display panel 404 disposed between the backlight module 406 and the prism module 130. The display panel 404 includes the display area 110 and the frame area 120. The related description of the display area 110, the frame area 120, and the prism module 130 may refer to the display apparatus 300 of the embodiment in FIG. 3, and will not be repeated.

In the present embodiment, the backlight module 406 has a reverse prism set 407 located below the edge area EA of the display area 110. The reverse prism set 407 includes a plurality of prisms 407a which have tips facing toward a direction away from the display panel 404. To be more specific, the backlight module 406 is used to provide the light source for the display panel 404 to display the image. The light beams emitted by backlight module 406 includes the light beams L1, which is obliquely emitted, and the light beams L2, which is emitted forward and upright. The light beams L1 are a part of the light beams emitted from the backlight module 406 that has a larger opening angle, and the light beams L2 are a part of the light beams emitted from the backlight module 406 that has a smaller opening angle. In the present embodiment, the light beams L1 are obliquely transmitted to the reverse prism set 407 and refracted by the prisms 407a of the reverse prism set 407 so that the transmission direction of the light beams L1 is changed. Subsequently, the light beams L1 refracted by the prisms 407a are transmitted forward and upright to the position above the display area 110. In addition, the light beams L2 are transmitted forward and upright to the reverse prism set 407 and refracted by the prisms 407a of the reverse prism set 407 so that the transmission direction of the light beams L2 is changed. After that, the light beams L2 refracted by the prisms 407a are obliquely transmitted to the first prism set 132 located above the frame area 120, and refracted by the prisms 132a of the first prism set 132 so that the transmission direction of the light beams L2 is changed. Subsequently, the light beams L2 refracted by the prisms 132a are transmitted forward and upright to the position above the frame area 120. In the present embodiment, via the above-mentioned way, parts of the frame area 120 of the display apparatus 400 that is adjacent to the edges e of the display area 110 may also show the displayed image. Similarly, parts of the frame area 120 of the display apparatus 400 that is adjacent to the corners C1 of the display area 110 may also show the displayed image. In the present embodiment, the display apparatus 400 may also achieve the borderless display effect which is similar to the borderless display effect of the display apparatus 100 of the embodiment in FIG. 1A to FIG. 1F. Generally, in the light beams that are provided by the backlight module 406 and emitted from a plurality of pixels of the display panel 404, the part which has a smaller opening angle has a higher light intensity, and the part which has a larger opening angle has a lower light intensity. Referring to FIG. 3, in the embodiment in FIG. 3, the light beams of the image displayed by the frame area 120 are the part of the light beams that are emitted from a plurality of pixels (not shown) in the edge area of the display area 110 and has a larger opening angle. Therefore, the display brightness rendered by the frame area 120 of the embodiment in FIG. 3 is lower than the display brightness rendered by the display area 110, so as to form an uneven brightness/darkness between the display area 110 and the frame area 120. In contrast, referring to FIG. 4, in the present embodiment, the backlight module 406 has the reverse prism set 407 located below the edge area EA of the display area 110. The part of the light beams provided by the backlight module 406 that has a smaller opening angle, i.e., has a higher light intensity, is refracted to the first prism set 132 above the frame area 120 by the prisms 407a of the reverse prism set 407 and then emitted from the first prism set 132. Therefore, the display brightness rendered by the frame area 120 is increased so that the display brightness rendered by the frame area 120 approaches the display brightness rendered by the display area 110, so as to prevent the uneven brightness/darkness between the display area 110 and the frame area 120.

Figure 5A:
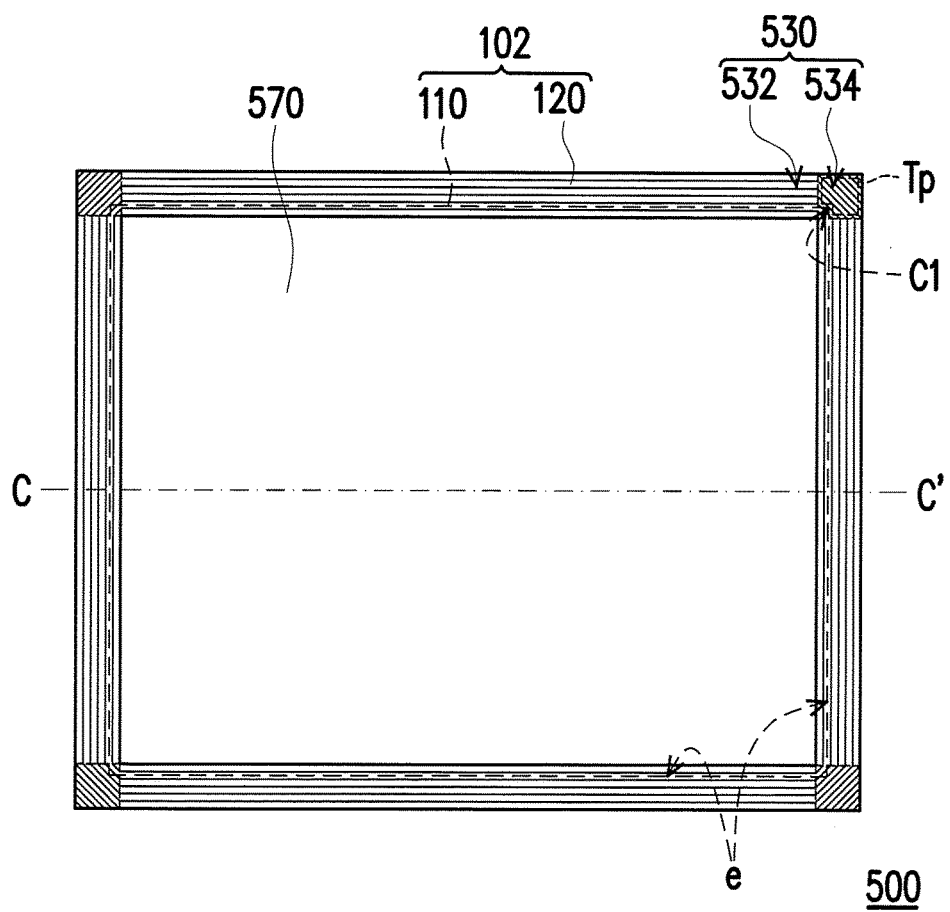
FIG. 5A is a schematic top view depicting a display apparatus of another embodiment of the invention.
Figure 5B:
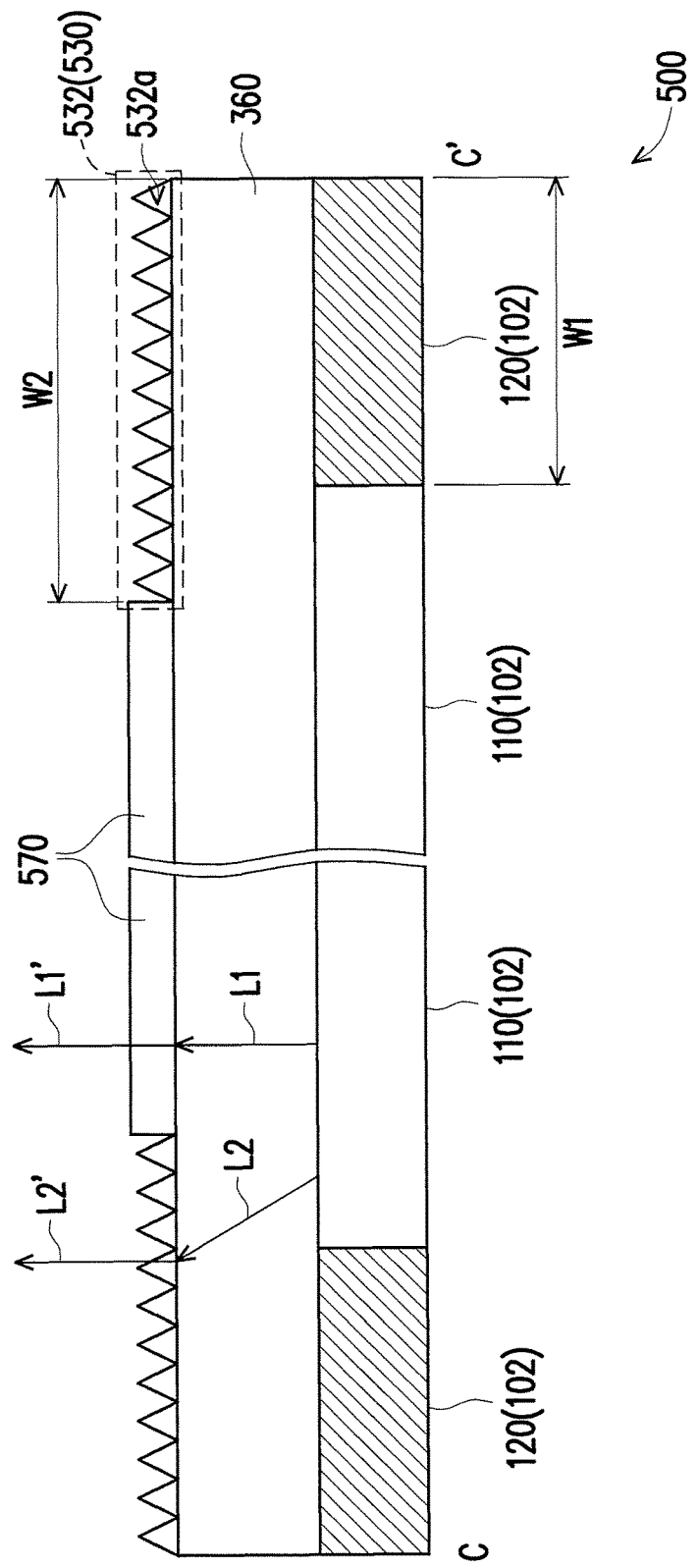
FIG. 5B is a cross-sectional view depicting the display apparatus along a line C-C' of the embodiment in FIG. 5A.

FIG. 5A is a schematic top view depicting a display apparatus of another embodiment of the invention, and FIG. 5B is a cross-sectional view depicting the display apparatus along a line C-C' of the embodiment in FIG. 5A. Referring to FIG. 5A and FIG. 5B simultaneously. In the present embodiment, the display apparatus 500 is similar to the display apparatus 100 that is depicted in FIG. 1A to FIG. 1F. The members and the related description of the display apparatus 500 may refer to the display apparatus 100 in FIG. 1A to FIG. 1F, and will not be repeated. The difference between the display apparatus 500 and the display apparatus 100 is that the display apparatus 500 includes the prism module 530, and the first prism sets 532 and the second prism sets 534 of the prism module 530 are located above the display area 110 and the frame area 120.

Referring to FIG. 5A, in the present embodiment, the frame area 120 has a turning part Tp beside the corner C1. The second prism set 534 covers the corner C1 of the display area 110 and the turning part Tp of the frame area 120 adjacent to the corner C1. In addition, the first prism sets 532 cover the edges e of the display area 110. In the present embodiment, the outer side of each of the first prism sets 532 is aligned with the outer side of the frame area 120, and the width of each of the first prism sets 532 in a direction parallel to the surface of the display area 110 is equal to 1 to 3 times the width of the frame area 120 in a direction parallel to the surface of the display area 110. To be more specific, the width of the frame area 120 in the direction parallel to the surface of the display area 110 is a width W1, and the width of the first prism set 532 in the direction parallel to the surface of the display area 110 is a width W2, the width W2 is equal to 1 to 3 times the width W1, preferably, the width W2 is equal to 2 times the width W1.

In the present embodiment, the display apparatus 500 further includes a light intensity attenuation element 570 which covers the display area 110 exposed by the prism module 530. The display area 110 emits the light beams L1 and the light beams L2. The light beams L2 are obliquely transmitted to the first prism set 532 and refracted by the prisms 532a of the first prism set 532 so as to be transmitted forward and upright. In addition, the light beams L1 are not transmitted through the first prism set 532, instead, the light beams L1 are transmitted through the light intensity attenuation element 570 and then transmitted forward and upright. To be more specific, in the light beams that are generally emitted from the display area 110, the light intensity of the upright light beams L1 is higher than the light intensity of the oblique light beams L2. After the light beams L2 are transmitted through the prisms 532a, the light intensity of the light beams L2 is further attenuated to form the light beams L2' having lower light intensity, and after the light beams L1 are transmitted through the light intensity attenuation element 570, the light intensity of the light beams L1 is also attenuated to form the light beams L1' having lower light intensity. In the present embodiment, because the light intensity of the light beams L1' is similar to the light intensity of the light beams L2', therefore, the brightness of the displayed image constructed by the light beams L1' and the light beams L2' is uniform. In the present embodiment, the light intensity attenuation element 570 may be, for example, a neutral density filter (ND filter), a polarizer, or may be other types of light intensity attenuation plates, and the invention is not limited thereto. In the present embodiment, the display apparatus 500 may also achieve the borderless display effect which is similar to the borderless display effect of the display apparatus 100 of the embodiment in FIG. 1A to FIG. 1F.

Figure 6A:
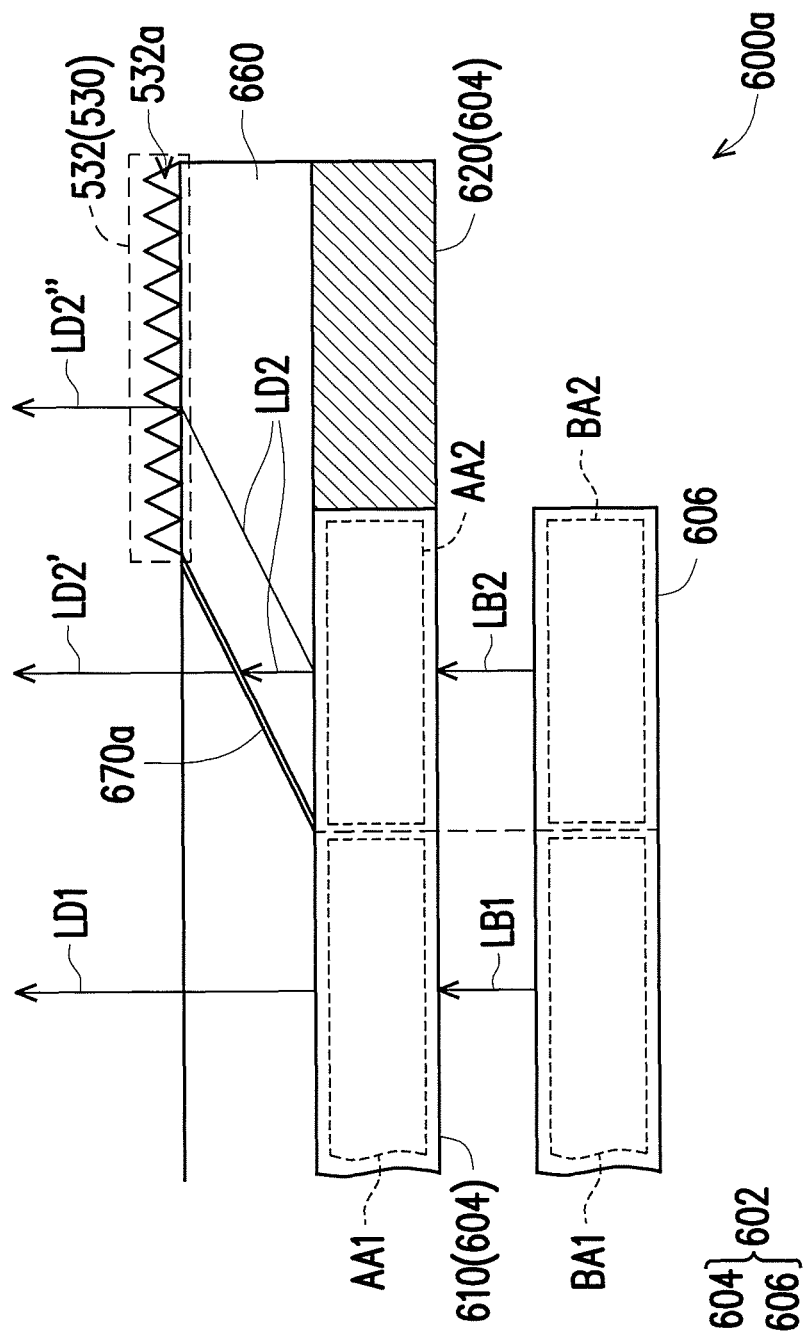
FIG. 6A is a cross-sectional view depicting a junction between an edge of a display area and a frame area of a display apparatus of another embodiment of the invention.

FIG. 6A is a cross-sectional view depicting a junction between an edge of a display area and a frame area of a display apparatus of another embodiment of the invention, referring to FIG. 6A. In the present embodiment, the display apparatus 600a is similar to the display apparatus 500 of the embodiment in FIG. 5A to FIG. 5B. The members and the related description of the display apparatus 600a may refer to the display apparatus 500 in FIG. 5A to FIG. 5B, and will not be repeated. The difference between the display apparatus 600a and the display apparatus 500 is that the display device 602 of the display apparatus 600a includes a backlight module 606 and a display panel 604 disposed between the backlight module 606 and the prism module 530. The display panel 604 includes the display area 610 and the frame area 620. In addition, the display apparatus 600a includes the light-transmitting element 660 disposed between the first prism set 532 and the display device 602. In the present embodiment, at least the display area 610 includes a display region AA1 and a display region AA2 located at the junction of the display area 610 and the frame area 620, wherein the display region AA2 is located between the display region AA1 and the frame area 620. At least, the backlight module 606 includes a backlight area BA1 and a backlight area BA2, wherein the backlight area BA1 corresponds to the display region AA1, and the backlight area BA2 corresponds to the display region AA2. To be more specific, the backlight area BA1 is used to provide the light source for the display region AA1 to display the image, and the backlight area BA2 is used to provide the light source for the display region AA2 to display the image. In the present embodiment, the display apparatus 600a further includes a light intensity attenuation element 670a. The light intensity attenuation element 670a is disposed on the display panel 604 and located in the light-transmitting element 660. An end of the light intensity attenuation element 670a is located between the display region AA1 and the display region AA2, and another end of the light intensity attenuation element 670a is connected to the first prism set 532. To be more specific, the light intensity attenuation element 670a is configured to be inclined with respect to the display panel 604 or inclined with respect to the first prism set 532.

In the present embodiment, after the light beams LB1 emitted from the backlight area BA1 enter the display region AA1, the light beams LD1 that are transmitted forward and upright are formed. After the light beams LB2 emitted from the backlight area BA2 enter the display region AA2, the light beams LD2 are formed. To be more specific, a part of the light beams LD2 that has a larger opening angle is obliquely transmitted to the first prism set 532 and refracted by the prisms 532a of the first prism set 532 so as to be transmitted forward and upright. After the part of the light beams LD2 that has a larger opening angle and has a lower light intensity is transmitted through the prisms 532a, its light intensity is further attenuated, so as to form the light beams LD2" having a lower light intensity. In addition, a part of the light beams LD2 that has a smaller opening angle and has a higher light intensity is transmitted forward and upright after passing through the light intensity attenuation element 670a. After the light beams LD2 pass through the light intensity attenuation element 670a, the light intensity of the light beams LD2 is also attenuated, so as to form the light beams LD2' having a lower light intensity. In addition, in the present embodiment, the light intensity of the light beams LB1 emitted from the backlight area BA1 is controlled to be lower than the light intensity of the light beams LB2 emitted from the backlight area BA2, so that the light intensity of light beams LD1 is lower the light intensity of light beams LD2. To be more specific, because the light intensities of the light beams LD1, the light beams LD2', and the light beams LD2" are similar to each other, therefore, the brightness of the displayed image constructed by the light beams LD1, the light beams LD2', and the light beams LD2" is uniform. In the present embodiment, the display apparatus 600a may also achieve the borderless display effect which is similar to the borderless display effect of the display apparatus 100 of the embodiment in FIG. 1A to FIG. 1F.

Figure 6B:
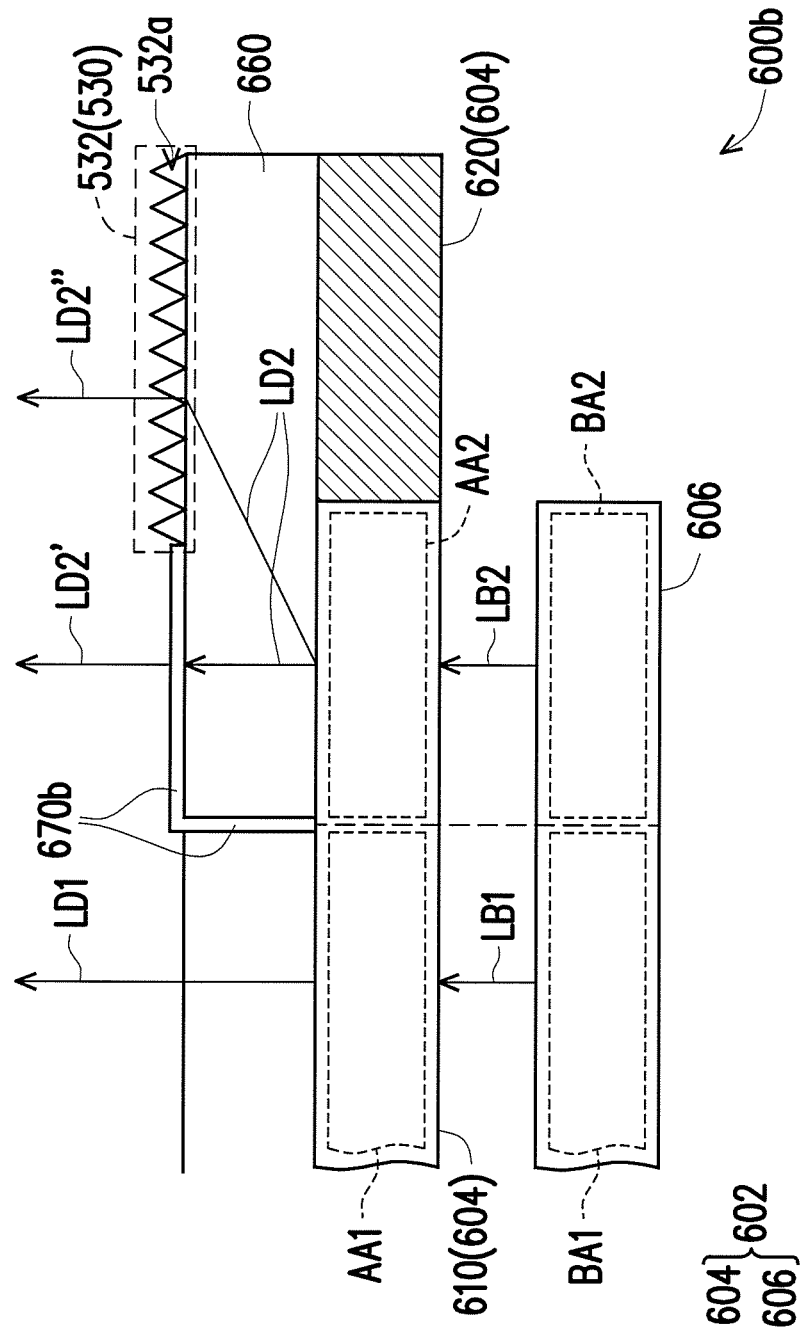
FIG. 6B is a cross-sectional view depicting a junction between an edge of a display area and a frame area of a display apparatus of another embodiment of the invention.

FIG. 6B is a cross-sectional view depicting a junction between an edge of a display area and a frame area of a display apparatus of another embodiment of the invention, referring to FIG. 6B. In the present embodiment, the display apparatus 600b is similar to the display apparatus 600a of the embodiment in FIG. 6A. The members and the related description of the display apparatus 600b may refer to the display apparatus 600a in FIG. 6A, and will not be repeated. The difference between the display apparatus 600b and the display apparatus 600a is that an end of the light intensity attenuation element 670b is located between the display region AA1 and the display region AA2, and another end of the light intensity attenuation element 670b is connected to the first prism set 532. To be more specific, a part of the light intensity attenuation element 670b is located on the light-transmitting element 660, and another part of the light intensity attenuation element 670b is located in the light-transmitting element 660. A part of the light intensity attenuation element 670b is, for example, configured to be parallel to the display panel 604, and another part of the light intensity attenuation element 670b is, for example, configured to be perpendicular to the display panel 604. In addition, in some embodiments, the light intensity attenuation element 670b and the light-transmitting element 660 are adhered to each other by the optical adhesive, but the invention is not limited thereto.

In the present embodiment, a part of the light beams LD2 that has a smaller opening angle and has a higher light intensity is transmitted forward and upright after passing through the light intensity attenuation element 670b. After the light beams LD2 pass through the light intensity attenuation element 670b, the light intensity of the light beams LD2 is also attenuated, so as to form the light beams LD2' having a lower light intensity. To be more specific, it is similar to the display apparatus 600a of the embodiment in the FIG. 6A, the light intensity of the light beams LB1 emitted from the backlight area BA1 is controlled to be lower than the light intensity of the light beams LB2 emitted from the backlight area BA2, so that the light intensities of the light beams LD1, the light beams LD2', and the light beams LD2" are similar to each other. Therefore, the brightness of the displayed image constructed by the light beams LD1, the light beams LD2', and the light beams LD2" is uniform. Moreover, the display apparatus 600b may also achieve the borderless display effect which is similar to the borderless display effect of the display apparatus 100 of the embodiment in FIG. 1A to FIG. 1F.

Figure 7:
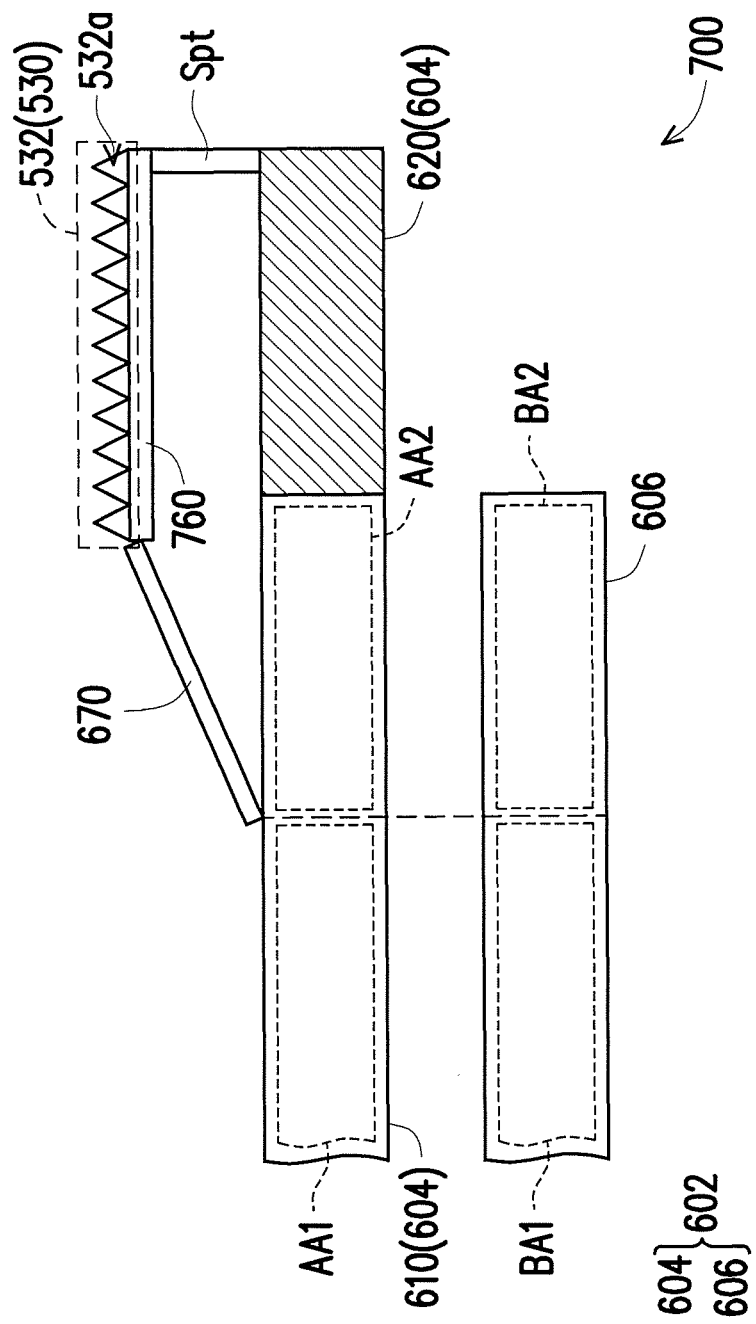
FIG. 7 is a cross-sectional view depicting a junction between an edge of a display area and a frame area of a display apparatus of another embodiment of the invention.

FIG. 7 is a cross-sectional view depicting a junction between an edge of a display area and a frame area of a display apparatus of another embodiment of the invention, referring to FIG. 7. In the present embodiment, the display apparatus 700 is similar to the display apparatus 600a of the embodiment in FIG. 6A. The members and the related description of the display apparatus 700 may refer to the display apparatus 600a in FIG. 6A, and will not be repeated. The difference between the display apparatus 700 and the display apparatus 600a is that the display apparatus 700 further includes a support member Spt disposed between the light-transmitting element 760 and the display device 602. The support member Spt is used to support the light-transmitting element 760. In addition, an end of the light intensity attenuation element 670 of the display apparatus 700 is located inside the display area 610, and another end of the light intensity attenuation element 670 is connected to the first prism set 532. To be more specific, an end of the light intensity attenuation element 670 is located between the display region AA1 and the display region AA2, and another end of the light intensity attenuation element 670 is connected to the first prism set 532. Therein, the light intensity attenuation element 670 of the display apparatus 700 is, for example, configured to be inclined with respect to the display panel 604, the display region AA1, or the first prism set 532. In the present embodiment, the display apparatus 700 may also achieve the borderless display effect which is similar to the borderless display effect of the display apparatus 100 of the embodiment in FIG. 1A to FIG. 1F. In addition, the brightness of the displayed image of the display apparatus 700 is uniform.

Figure 8A:
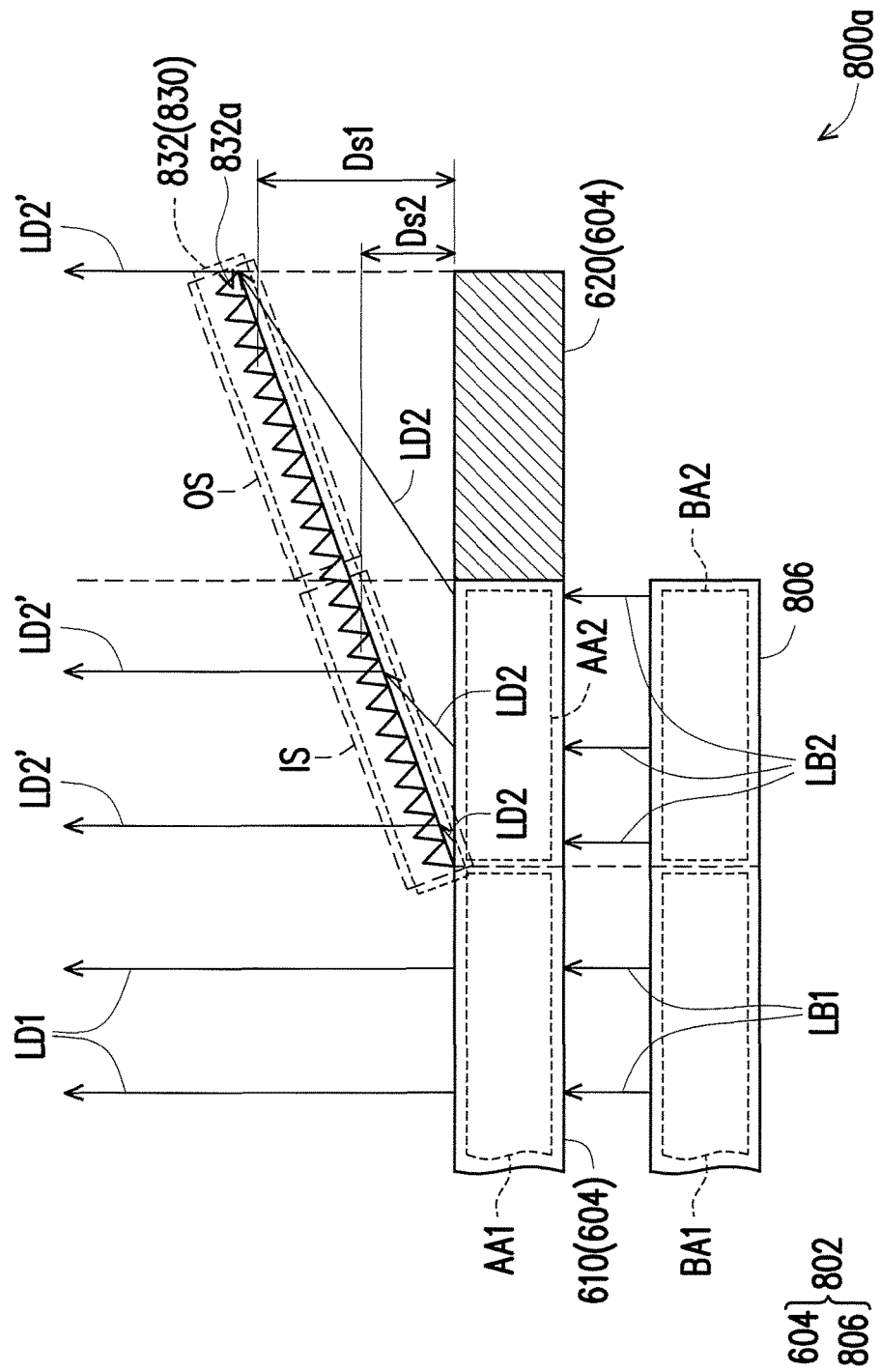
FIG. 8A is a cross-sectional view depicting a junction between an edge of a display area and a frame area of a display apparatus of another embodiment of the invention.

FIG. 8A is a cross-sectional view depicting a junction between an edge of a display area and a frame area of a display apparatus of another embodiment of the invention, referring to FIG. 8A. In the present embodiment, the display apparatus 800a is similar to the display apparatus 100 that is depicted in FIG. 1A to FIG. 1F. The members and the related description of the display apparatus 800a may refer to the display apparatus 100 in FIG. 1A to FIG. 1F, and will not be repeated. The difference between the display apparatus 800a and the display apparatus 100 is that the display device 802 of the display apparatus 800a includes a backlight module 806 and a display panel 604 disposed between the backlight module 806 and the prism module 830. The display panel 604 includes the display area 610 and the frame area 620. In the present embodiment, the description related to the display area 610 and the frame area 620 may refer to the related description of the display area 610 and the frame area 620 of the embodiment in FIG. 6, and will not be repeated.

In one embodiment of the invention, each of the first prism sets 832 is obliquely extended with respect to the surface of the display area 610 from its inner side IS to its outer side OS. The inner side IS of the first prism set 832 is located over the display area 610, the outer side OS of the first prism set 832 is located above the frame area 620, and the distance Ds2 between the inner side IS of the first prism set 832 and the display area 610 is smaller than the distance Ds1 between the outer side OS of the first prism set 832 and the frame area 620. To be more specific, a part of the light-emitting area of the backlight module 806 that is uncovered by the prism module 830, namely the backlight area BA1, emits the light beams LB1. A part of the light-emitting area of the backlight module 806 that is covered by the prism module 830, namely the backlight area BA2, emits the light beams LB2. In the present embodiment, the brightness of the light-emitting area of the backlight module 806 covered by the prism module 830 is greater than the brightness of the light-emitting area of the backlight module 806 uncovered by the prism module 830. In other words, the brightness of the light beams LB2 is greater than the brightness of the light beams LB1. To be more specific, the part in the display area 610 that is uncovered by the prism module 830, namely the display region AA1, emits the light beams LD1. The part in the display area 610 that is covered by the prism module 830, namely the display region AA2, emits the light beams LD2. In the present embodiment, the brightness level of the display area 610 covered by the prism module 830 is greater than the brightness level of the display area 610 that is uncovered by the prism module 830. In other words, the brightness of the light beams LD2 is greater than the brightness of the light beams LD1. The light beams LD2 are refracted after passing through the prisms 832a, and transmitted forward and upright. After the light beams LD2 pass through the prisms 832a, the light intensity of the light beams LD2 is attenuated, so as to form the light beams LD2' having a lower light intensity. Specifically, because the light intensity of the light beams LD1 is similar to the light intensity of the light beams LD2', therefore, the brightness of the displayed image constructed by the light beams LD1 and the light beams LD2' is uniform.

In the present embodiment, in the image displayed by the display area 610, the part of the image covered by each of the first prism sets 832 is corresponding to a correct image that should be displayed from the inner side IS to the outer side OS of the first prism set 832. To be more specific, the image displayed by the display region AA2 is corresponding to the correct image that is displayed from the inner side IS to the outer side OS of the first prism set 832, and this image is displayed above the display region AA2 and the frame area 620. In the present embodiment, the display apparatus 800a may also achieve the borderless display effect which is similar to the borderless display effect of the display apparatus 100 of the embodiment in FIG. 1A to FIG. 1F.

Figure 8B:
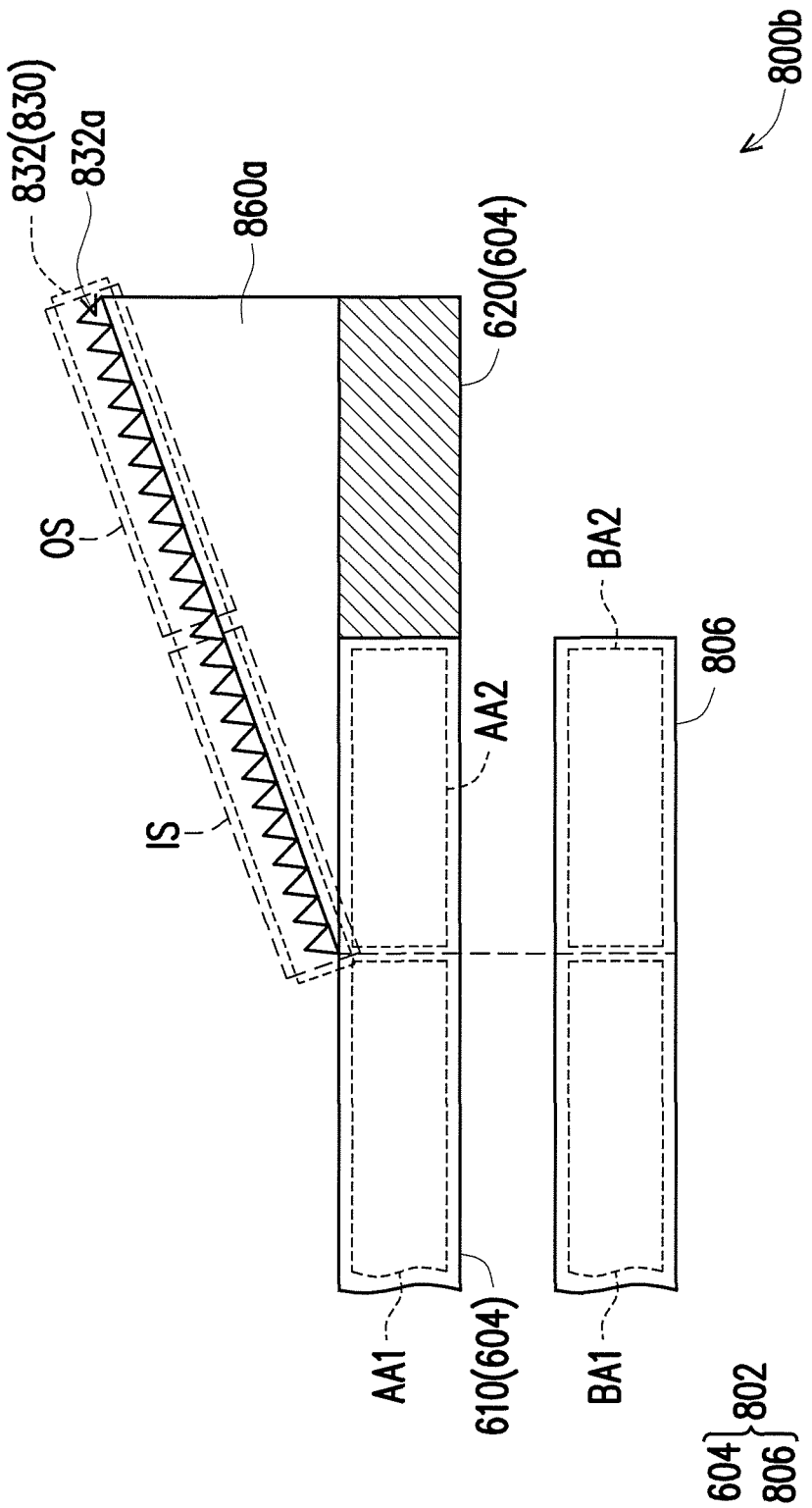
FIG. 8B is a cross-sectional view depicting a junction between an edge of a display area and a frame area of a display apparatus of another embodiment of the invention.

FIG. 8B is a cross-sectional view depicting a junction between an edge of a display area and a frame area of a display apparatus of another embodiment of the invention, referring to FIG. 8B. In the present embodiment, the display apparatus 800b is similar to the display apparatus 800a of the embodiment in FIG. 8A. The members and the related description of the display apparatus 800b may refer to the display apparatus 800a in FIG. 8A, and will not be repeated. The difference between the display apparatus 800b and the display apparatus 800a is that the display apparatus 800b further includes a light-transmitting element 860a disposed between the first prism set 832 and the display device 802. The light-transmitting element 860a carries the first prism set 832, wherein the first prism set 832 is adhered on the light-transmitting element 860a, and the light-transmitting element 860a is adhered or partly adhered on the display device 802. In the present embodiment, the display apparatus 800b may also achieve the borderless display effect which is similar to the borderless display effect of the display apparatus 100 of the embodiment in FIG. 1A to FIG. 1F.

Figure 8C:
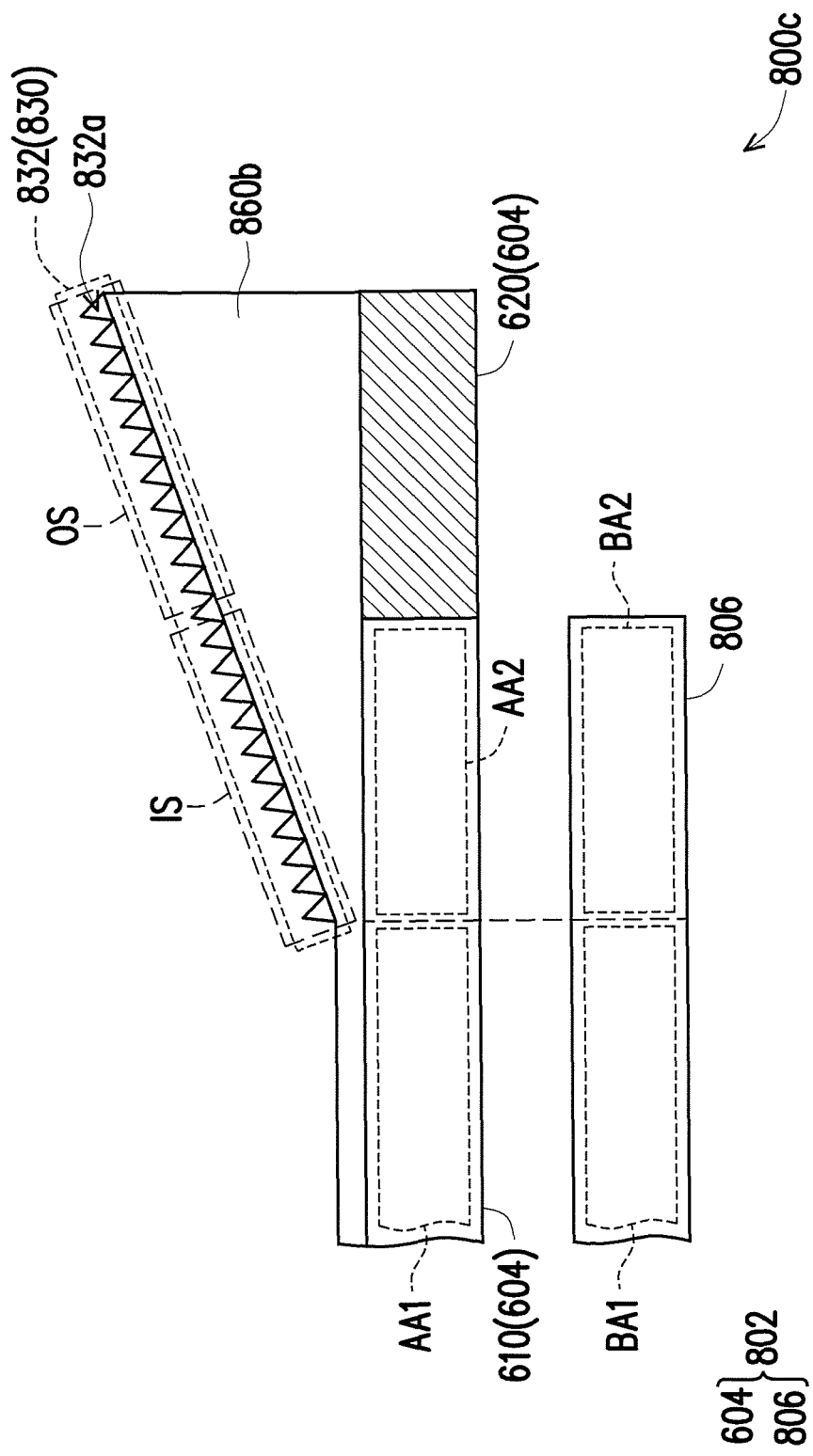
FIG. 8C is a cross-sectional view depicting a junction between an edge of a display area and a frame area of a display apparatus of another embodiment of the invention.

FIG. 8C is a cross-sectional view depicting a junction between an edge of a display area and a frame area of a display apparatus of another embodiment of the invention, referring to FIG. 8C. In the present embodiment, the display apparatus 800c is similar to the display apparatus 800b of the embodiment in FIG. 8B. The members and the related description of the display apparatus 800c may be referred to the display apparatus 800b in FIG. 8B, and will not be repeated. The difference between the display apparatus 800c and the display apparatus 800b is that the display apparatus 800c further includes a light-transmitting element 860b disposed between the first prism set 832 and the display device 802. The light-transmitting element 860b carries the first prism set 832 and covers the display area 610 and the frame area 620 of the display device 802, wherein the first prism set 832 is adhered on the light-transmitting element 860b, and the light-transmitting element 860b is adhered or partly adhered on the display device 802. In the present embodiment, the display apparatus 800c may also achieve the borderless display effect which is similar to the borderless display effect of the display apparatus 100 of the embodiment in FIG. 1A to FIG. 1F.

In summary, in the display apparatus of the embodiments of the invention, the prism module includes a plurality of first prism set and at least one second prism set. The first prism sets are respectively disposed beside a plurality of edges of the display area. The second prism set is disposed beside at least one corner of the display area, and the second prism set is adjacent to the first prism sets. The second prism set includes a plurality of prisms, and the prisms are arranged in the direction away from the corner of the display area. The extending direction of each of the prisms of the second prism set is inclined with respect to the edges of the display area which are adjacent to the corner. Therefore, the display apparatus can achieve a borderless display effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
   a display device, having a display area and a frame area surrounding the display area; and
   a prism module, disposed above the frame area, wherein the prism module comprises:
      a plurality of first prism sets, respectively disposed beside a plurality of edges of the display area; and
      at least one second prism set, disposed beside at least one corner of the display area and adjacent to the first prism sets, wherein the second prism set comprises a plurality of prisms arranged in a direction away from the corner of the display area, and an extending direction of each of the prisms of the second prism set is inclined with respect to the edges of the display area adjacent to the corner, wherein each of the first prism sets is obliquely extended with respect to a surface of the display area from an inner side of the first prism set to an outer side of the first prism set, the inner side of the first prism set is located over the display area, the outer side of the first prism set is located above the frame area, and a distance between the inner side of the first prism set and the display area is smaller than a distance between the outer side of the first prism set and the frame area.

2. The display apparatus as recited in claim 1, wherein the second prism set connects with the adjacent first prism sets.

3. The display apparatus as recited in claim 1, wherein each of the first prism sets comprises a plurality of prisms, the prisms are arranged in a direction away from the display area, and an extending direction of each of the prisms of each of the first prism sets is substantially parallel to the edge of the display area that is adjacent to the first prism set.

4. The display apparatus as recited in claim 1, wherein the second prism set and the frame area have a space therebetween.

5. The display apparatus as recited in claim 1, wherein each of the first prism sets and the frame area have a space therebetween.

6. The display apparatus as recited in claim 1, further comprising a light-transmitting element disposed between the first prism sets and the display device, and the light-transmitting element carries the first prism sets.

7. The display apparatus as recited in claim 6, wherein the first prism sets are adhered on the light-transmitting element.

8. The display apparatus as recited in claim 7, wherein at least one part of the light-transmitting element is adhered on the display device.

9. The display apparatus as recited in claim 1, wherein, in an image displayed by the display area, a part of the image covered by each of the first prism sets is corresponding to a correct image that should be displayed from the inner side to the outer side of the first prism sets.

10. The display apparatus as recited in claim 1, wherein a brightness level of the display area covered by the prism module is greater than a brightness level of the display area uncovered by the prism module.

11. The display apparatus as recited in claim 1, wherein the display device comprises a backlight module and a display panel disposed between the backlight module and the prism module, and a brightness of a light-emitting area of the backlight module covered by the prism module is greater than a brightness of the light-emitting area of the backlight module uncovered by the prism module.

12. The display apparatus as recited in claim 1, further comprising a light-transmitting cover covering the display area and the frame area, wherein the prism module is disposed between the light-transmitting cover and the display device.

13. The display apparatus as recited in claim 1, further comprising a parallax barrier disposed at an edge area of the display area, wherein the parallax barrier covers the edge area, has a plurality of light-shielding parts that shield a part of a plurality of pixels in the edge area, and has a plurality of light-transmitting parts that expose another part of the plurality of pixels in the edge area, a light emitted by the part of the pixels that are shielded by the light-shielding parts is obliquely transmitted to the prism module via the light-transmitting parts and refracted to a position above the prism module by the prism module, and a light emitted by another part of the pixels that are exposed by the light-transmitting parts is transmitted to a position above the display area.

14. The display apparatus as recited in claim 1, wherein acute angles between the extending direction of the prisms of the second prism set and the edges adjacent to the corner in the display area are greater than or equal to 15 degrees and smaller than or equal to 75 degrees.

15. The display apparatus as recited in claim 1, further comprising a light intensity attenuation element covering a portion of the display area exposed by the prism module.

16. The display apparatus as recited in claim 15, wherein an end of the light intensity attenuation element is located in the display area, and another end of the light intensity attenuation element is connected to the first prism set.

17. The display apparatus as recited in claim 1, wherein each of the first prism sets comprises a plurality of prisms, tips of the prisms of the first prism sets face toward a direction away from the frame area, and tips of the prisms of the second prism set face toward a direction away from the frame area.

18. The display apparatus as recited in claim 1, wherein each of the first prism sets comprises a plurality of prisms, tips of the prisms of the first prism sets face toward the frame area, and tips of the prisms of the second prism set face toward the frame area.

19. The display apparatus as recited in claim 1, wherein the second prism set covers the corners of the display area and a turning part of the frame area adjacent to the corners.

20. The display apparatus as recited in claim 1, wherein the display device comprises a backlight module and a display panel disposed between the backlight module and the prism module, the backlight module has a reverse prism set located below an edge area of the display area, the reverse prism set comprises a plurality of prisms which have tips facing toward a direction away from the display panel.

21. A display apparatus, comprising:
a display device, having a display area and a frame area surrounding the display area; and
a prism module, disposed above the frame area, wherein the prism module comprises:
a plurality of first prism sets, respectively disposed beside a plurality of edges of the display area; and
at least one second prism set, disposed beside at least one corner of the display area and adjacent to the first prism sets, wherein the second prism set comprises a plurality of prisms arranged in a direction away from the corner of the display area, and an extending direction of each of the prisms of the second prism set is inclined with respect to the edges of the display area adjacent to the corner, wherein an outer side of each of the first prism sets is aligned with an outer side of the frame area, and a width of each of the first prism sets in a direction parallel to a surface of the display area is equal to 1 to 3 times a width of the frame area in a direction parallel to the surface of the display area.

* * * * *